United States Patent [19]
Sause

[11] 3,951,434
[45] Apr. 20, 1976

[54] THREE-WAY TRAILER HITCH
[76] Inventor: Alfred J. Sause, 8636 Baltimore National Pike, Ellicott City, Md. 21043
[22] Filed: Jan. 31, 1975
[21] Appl. No.: 545,808

[52] U.S. Cl............................................. 280/415 A
[51] Int. Cl.².......................................... B60D 1/16
[58] Field of Search............ 280/415 R, 415 A, 515

[56] References Cited
UNITED STATES PATENTS

| | | | |
|---|---|---|---|
| 2,940,775 | 6/1960 | Farrow et al. | 280/415 A |
| 2,968,494 | 1/1961 | Klouda | 280/415 A |

*Primary Examiner*—M. H. Wood, Jr.
*Assistant Examiner*—R. Schrecengost
*Attorney, Agent, or Firm*—Laurence, Stokes & Neilan

[57] ABSTRACT

A trailer tongue having a socket for accepting a ball-pin and a hitch bar having a loop at one end, a clevis at the other end, and a ball pin in the middle. Keyways on both the trailer tongue and the hitch are positioned to align with one another when the hitch bar is attached to the tongue by the ball-pin and socket coupling. A locking pin is placed through the aligned keyways to stabilize the hitch bar with respect to the trailer tongue.

2 Claims, 3 Drawing Figures

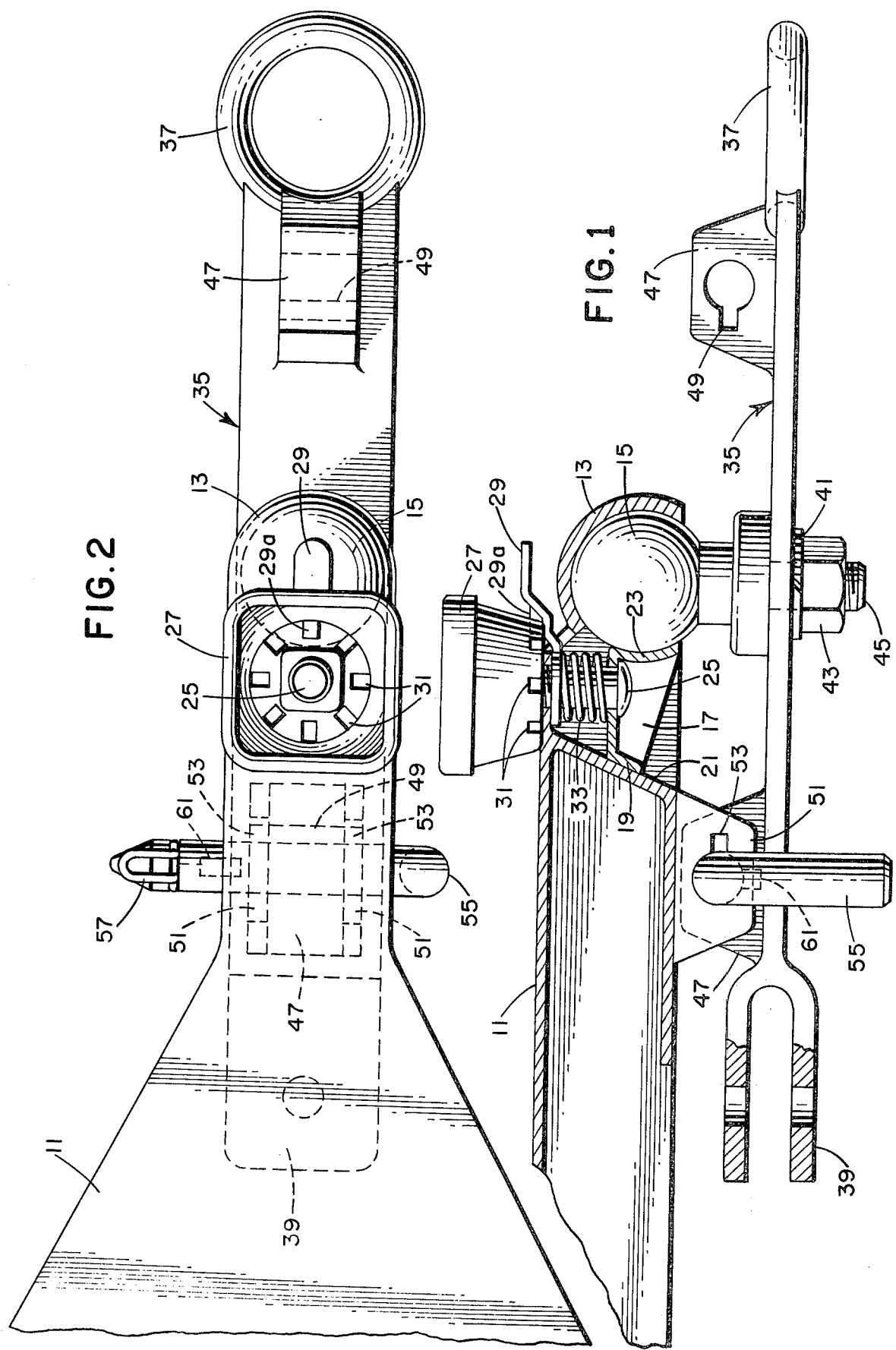

THREE-WAY TRAILER HITCH

BACKGROUND OF THE INVENTION

The invention generally relates to trailer hitching apparatus for coupling a trailer or the like to a draw vehicle. There are several types of commercially available hitches for such use. For example, there are ball and socket, clevis and pin, and loop and hook mechanisms which are widely used. However, each type of hitch requires the use of specific complementary couplings on the trailer and the draw vehicle respectively. A trailer having a coupling for one type of hitch cannot be attached to a draw vehicle having a coupling for a different type of hitch. Moreover, the attachment of the respective coupling parts to the trailer and the draw vehicle is usually complex and difficult because of the amount of stress and force the coupling parts transmit to the trailer and the draw vehicle when in use. This lack of interchangeability and the difficulty of attaching and removing the coupling parts produces great difficulty and inconvenience in situations where the coupling parts of the trailer and the draw vehicle are not of the same type. Prior art devices have attempted to overcome these difficulties by providing hitching apparatus which could be adapted for use with more than one type of hitch. However, these devices either were not capable of adapting to all the standard types of hitches or they were difficult to adapt to the various types of hitches as well as lacking sufficient stability.

It is, therefore, a primary object of the present invention to provide an improved three-way hitching apparatus.

A further object is to provide an improved three-way hitch which is easy to adapt to the various types of hitching apparatus.

Another object is to provide an improved three-way hitch which is stable in all its configurations.

SUMMARY OF THE INVENTION

The present invention accomplishes these and other objects with a trailer tongue having a socket for capturing a standard ball-pin and a hitch bar having a loop at one end, a clevis at the other end, and a ball-pin in the middle. Keyways are provided in flanges on the trailer tongue behind the socket. Blocks with matching keyways are also provided on the hitch bar on either side of the ball-pin and adjacent the loop and the clevis. The keyways in the trailer tongue and on the hitch bar are positioned to align with one another when the hitch bar is mounted in the trailer tongue socket by the ball-pin with either end facing the draw vehicle. A locking pin inserted through the keyways provides the desired stability in cooperation with the ball and socket coupling. Use of either end of the hitch bar allows a clevis and pin type coupling or a loop and hook type coupling. Removal of the hitch bar allows the trailer tongue to be used directly with a ball-pin hitch.

BRIEF DESCRIPTION OF THE DRAWINGS

The foregoing objects, features and advantages of the present invention, as well as other advantages which may be attained by its use, will be apparent from the following detailed description when read in conjunction with the accompanying drawing wherein:

FIG. 1 is a side elevation, partially in section, of the trailer hitch of the present invention;

FIG. 2 is a top plan view of the trailer hitch of the present invention; and

DETAILED DESCRIPTION OF THE INVENTION

Figure 3:
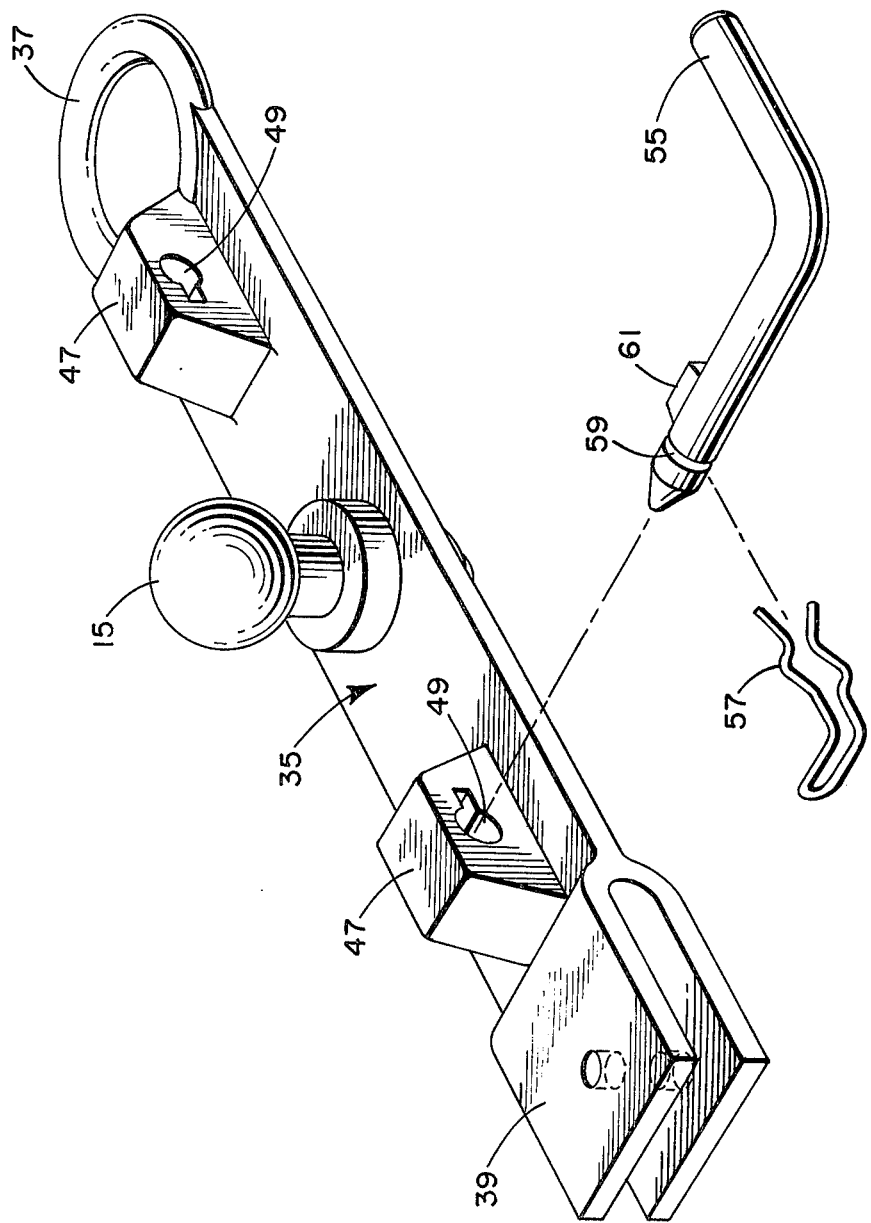
FIG. 3 is an exploded perspective view of the hitch bar and key pin used in the trailer hitch of the present invention.

The trailer hitch of the present invention includes a trailer tongue 11 which is to be attached to a trailer or the like. The trailer tongue 11 has a semi-circular socket 13 at one end for accepting a ball-pin 15. A tightening wedge 17 serves to fixedly locate the ball-pin 15 against the inner surface of the socket 13. The tightening wedge 17 has a flat end 19 which rests against an inclined surface 21 within the trailer tongue 11 and a curved end 23 which rests against the ball-pin 15. A bolt 25 is attached to the wedge 17 and passes through a hole in the top of the trailer tongue 11. A rotatable knob 27 engages the threads of the bolt 25 above the top of the trailer tongue 11 for allowing selective upward displacement of the wedge 17. The inclined surface 21 within the trailer tongue 11 is provided to cooperate with the flat end 19 of the wedge 17 to push the curved end 23 of the wedge 17 against the ball-pin 15 when the knob 27 is tightened. A locking lever 29 is loosely mounted around the bolt 25 and extends outward through a hole in the trailer tongue 11. A lug 29a integral with the lever 29 cooperates with any one of a plurality of notches 31 on the knob 27 to prevent rotation of the knob 27 when one of the notches 31 is engaged. A biasing spring 33 surrounds the bolt 25 and is interposed between the locking lever 29 and the top of the wedge 17. The pressure from the spring 33 forces the locking lever 29 against the bottom side of the top of the trailer tongue 11 when the wedge 17 is sufficiently displaced upward, resulting in the engagement of one of the notches 31 by the locking lug 29a. The lever 29 may be manually depressed to release it from one of the notches 31. The spring 33 also serves to force the wedge 17 downward and thereby releases the curved end 23 of the wedge 17 from the ball-pin 15 when the bolt 25 is loosened upon rotation of the knob 27. This allows removal of the ball-pin 15 from the socket 13.

A hitch bar 35 includes a ring 37 at one end and a clevis 39 at the other end. The ball-pin 15 is attached to the middle of the hitch bar 35 by a lock washer 41 and a nut 43 which receives a bolt 45 attached to the ball-pin 15. Blocks 47 are mounted at either of the hitch bar 35 equidistant from the ball-pin 15. Keyways 49 extend laterally through the blocks 47. A pair of flanges 51 are mounted on the trailer tongue 11 to accept one of the blocks 47 therebetween. Keyways 53 are provided in the flanges 51 to align with the keyways 49 in the blocks 47. A keyed pin 55 is inserted through the aligned keyways (49,53). The interlocking structure thus formed by the block 47, the flanges 51 and the keyed pin 55 cooperates with the ball-pin 15 secured against the socket 13 for providing a fixed attachment of the hitch bar 35 to the trailer tongue 11. A removeable clip 57 resides in a circumferential groove 59 at the tip of the keyed pin 55. A key lug 61 on pin 55 matches the keyway in blocks 47 and flanges 51.

The above described structure facilitates the attachment of the trailer tongue to various types of hitches mounted on draw vehicles. Attaching the hitch bar 35 as shown in FIG. 1 with the loop 37 free for attachment to the draw vehicle allows the draw vehicle to have a hook or similar mechanism for engaging the loop 37. Attachment of the hitch bar 35 with the clevis 39 toward the draw vehicle allows the draw vehicle to have a clevis and pin hitching mechanism. In either configuration stability and security of the coupling between the trailer and the draw vehicle is achieved by the rigid structure created by the ball-pin and socket (15,13) coupling and the interlocking block and flanges (47,51). Removal of the hitch bar 35 allows the attachment of the trailer tongue 11 to a standard ball-pin mounted on the draw vehicle.

From the foregoing it will be obvious to those skilled in the art that various modifications may be made within the spirit and scope of the present invention.

What is claimed is:

1. A trailer hitch for attaching a trailer to a draw vehicle comprising:
   a trailer tongue having two ends, one of said ends being attached to the trailer;
   a socket at the other end of said trailer tongue for accepting a ball-pin;
   means on the trailer tongue for securing a ball-pin within said socket;
   an elongated hitch bar having a loop at one end, a clevis at the other end and a ball-pin fixedly attached between said loop and said clevis, said ball-pin being selectively engageable in said socket for allowing said hitch bar to pivot about said socket and for allowing either of said loop or said clevis to be attached to the draw vehicle; and
   locking means for stabilizing the attachment of said hitch bar to said trailer tongue when either end of said hitch bar is to be attached to the draw vehicle.

2. The trailer hitch of claim 1 wherein said locking means comprises:
   blocks mounted on said bar on either side of said ball-pin and equidistant from said ball-pin, each of said blocks having a keyway;
   a pair of parallel flanges having keyways mounted on said trailer tongue between the trailer and said socket, said flanges being adapted to accept either of said blocks between said flanges with the respective keyways in alignment when said ball-pin is engaged in said socket; and
   a locking pin insertable through said keyways.

* * * * *